United States Patent
Fukatsu et al.

(10) Patent No.: US 8,272,879 B2
(45) Date of Patent: Sep. 25, 2012

(54) PLANAR CONNECTOR

(75) Inventors: Hiroki Fukatsu, Fuji (JP); Raita Nishikawa, Fuji (JP); Hirokazu Ohshiba, Fuji (JP); Seiji Kayukawa, Fuji (JP); Kazufumi Watanabe, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 176 days.

(21) Appl. No.: 12/993,532

(22) PCT Filed: May 19, 2009

(86) PCT No.: PCT/JP2009/002190
§ 371 (c)(1),
(2), (4) Date: Nov. 19, 2010

(87) PCT Pub. No.: WO2009/141996
PCT Pub. Date: Nov. 26, 2009

(65) Prior Publication Data
US 2011/0086968 A1 Apr. 14, 2011

(30) Foreign Application Priority Data
May 23, 2008 (JP) ................. 2008-135405

(51) Int. Cl.
*H01R 24/00* (2011.01)
*C08K 3/34* (2006.01)
*C08K 7/02* (2006.01)
*C08L 67/02* (2006.01)
*C09K 19/38* (2006.01)

(52) U.S. Cl. .......... 439/67; 439/625; 524/449; 524/451; 524/599; 252/299.62; 252/299.66; 252/299.67

(58) Field of Classification Search .................. 439/67, 439/625; 524/449, 451, 599; 252/299.62, 252/299.66, 299.67
See application file for complete search history.

(56) References Cited

U.S. PATENT DOCUMENTS
4,889,886 A  12/1989  Wada et al.
(Continued)

FOREIGN PATENT DOCUMENTS
JP  63-146959 A  6/1988
(Continued)

OTHER PUBLICATIONS

International Search Report (PCT/ISA/210) issued on Jun. 16, 2009, by Japanese Patent Office as the International Searching Authority for International Application No. PCT/JP2009/002190.

(Continued)

*Primary Examiner* — Shean C Wu
(74) *Attorney, Agent, or Firm* — Buchanan Ingersoll & Rooney (57) ABSTRACT

The present invention provides a planar connector having excellent performances including flatness, warp-deformation resistance, and heat resistance, being capable of responding to shape changes in recent planar connectors. Specifically, the planar connector is composed of a composite resin composition comprises (A) a liquid crystalline polymer containing 55% by mole or less of p-hydroxy benzoic acid residue and having a melting point of 330° C. or higher, (B) a plate-like inorganic filler, and (C) a fibrous filler having a weight average fiber length within a range of 250 to 600 μm, the amount of (B) component being 25 to 35% by weight to the total composition, the amount of (C) component being 10 to 25% by weight to the total composition, the sum in total of (B) component and (C) component being 40 to 50% by weight to the total composition, wherein the connector has a lattice structure inside an outer frame, and has an opening inside the lattice area, and wherein the pitch interval of the lattice area is 1.5 mm or less, and the ratio of the thickness of the thickness of the lattice area to the outer frame area is 0.8 or less.

8 Claims, 4 Drawing Sheets

(a)  (b)

U.S. PATENT DOCUMENTS

| | | |
|---|---|---|
| 6,702,955 B1 | 3/2004 | Murakami et al. |
| 6,797,198 B1 | 9/2004 | Miyashita et al. |
| 7,789,670 B2 | 9/2010 | Fukatsu et al. |
| 7,980,897 B2 * | 7/2011 | Fukatsu et al. ............... 439/625 |
| 2002/0017631 A1 | 2/2002 | Maeda et al. |
| 2003/0030031 A1 | 2/2003 | Miyashita et al. |
| 2007/0197706 A1 | 8/2007 | Fukatsu et al. |
| 2009/0197471 A1 | 8/2009 | Fukatsu et al. |

FOREIGN PATENT DOCUMENTS

| | | |
|---|---|---|
| JP | 9-204951 A | 8/1997 |
| JP | 2000-178443 A | 6/2000 |
| JP | 2001-207054 A | 7/2001 |
| JP | 2001-288342 A | 10/2001 |
| JP | 2003-109700 A | 4/2003 |
| JP | 2003-268252 A | 9/2003 |
| JP | 2005-276758 A | 10/2005 |
| JP | 2007-161898 A | 6/2007 |
| WO | WO 01/27205 A1 | 4/2001 |
| WO | WO 2005/093909 A1 | 10/2005 |
| WO | WO 2008/023839 A1 | 2/2008 |

OTHER PUBLICATIONS

"Full scale survey of Engineering plastic: 1992-1993," pp. 182-194 (1994), Nikkei New Material supplementary volume (includes partial English translation).

* cited by examiner

PLANAR CONNECTOR

TECHNICAL FIELD

The present invention relates to a planar connector having a lattice structure within the outer frame, being used for CPU socket, and the like.

BACKGROUND ART

Among thermoplastic resins, liquid crystalline polymers are known as the materials having excellent dimensional accuracy, damping function, and flowability, and generating very few flash during molding thereof. Due to these advantageous features, the liquid crystalline polymers have been widely adopted as the materials of various kinds of electronic parts.

In particular, connectors in recent years are requested to have increased performance of higher heat resistance (aiming at the increase in productivity by the advanced mounting technology), higher density (multi-pin), and smaller size than ever, accompanied with the increase in performance of electronics devices. By taking advantage of features of the above-mentioned liquid crystalline polymers, liquid crystalline polymer compositions reinforced with glass fiber are adopted as the connectors, ("Full scale survey of Engineering plastics: 1992-1993", pp. 182-194, (1992), and JP-A9-204951). The planar connector having a lattice structure within the outer frame, represented by CPU socket, shows a significant trend of the increased performance of higher heat resistance, higher density, and smaller size, and thus many kinds of liquid crystalline polymer compositions reinforced with glass fiber are adopted.

However, even the glass-fiber reinforced liquid crystalline polymer compositions having a good flowability to some extent had an unsatisfactory performance for using them as the very thin planar connector having a pitch interval of the lattice part of 2 mm or less and having a width of resin portion of 0.5 mm or less in the lattice area that supports terminals. That is, for a thin planar connector having very small width of the lattice area, in trying to filling the lattice area with resin, the filling pressure increases because of the insufficient flowability, which causes a problem of increased warpage of the obtained planar connector.

To solve the problem, there can be adopted a liquid crystalline polymer having good flowability with decreased amount of glass fiber. That type of composition, however, has poor strength, which then raises a problem of deformation by reflow during mounting.

At present, as described above, there is no planar connector made up of a liquid crystalline polymer, having good performance balance.

Responding to the situations, the inventors of the present invention have proposed a planar connector in JP-A 2005-276758, which planar connector is composed of a specific composite resin composition having a specified relation between the weight average length and the amount of the added fibrous filler.

DISCLOSURE OF THE INVENTION

According to the above JP-A 2005-276758, there can be obtained also a thin planar connector having excellent performances such as moldability, flatness, warp-deformation resistance, and heat resistance. However, by factors such as the shape change accompanied with the increase in the integration rate and the like, specifically increase in the number of connector pins and decrease in the width of lattice area, it was found that the above JP-A 2005-276758 cannot cope with the requirements in some cases.

In consideration of the above problems, the inventors of the present invention have conducted a detailed study to provide a planar connector made of a liquid crystalline polymer, having good performance balance and applicable to the changes in shape of the recent planar connectors, and found that there can be obtained a planar connector having excellent performances such as good moldability, flatness, warp-deformation resistance, heat resistance, and the like through the use of a composite resin composition prepared by blending (A) a liquid crystalline polymer with (B) a plate-like inorganic filler and (C) a specified fibrous filler, at a specified ratio, thus having perfected the present invention.

The present invention provides a planar connector, composed of a composite resin composition containing (A) a liquid crystalline polymer containing 55% by mole or less of p-hydroxy benzoic acid residue and having a melting point of 330° C. or higher, (B) a plate-like inorganic filler, and (C) a fibrous filler having a weight average fiber length within a range of 250 to 600 µm, the amount of (B) component being 25 to 35% by weight to the total composition, the amount of (C) component being 10 to 25% by weight to the total composition, the sum in total of (B) component and (C) component being 40 to 50% by weight to the total composition, wherein the connector has a lattice structure inside an outer frame, and has an opening inside the lattice area, and wherein the pitch interval of the lattice area is 1.5 mm or less, and the ratio of the thickness of the lattice area to the thickness of the outer frame area is 0.8 or less.

DETAIL DESCRIPTION OF THE INVENTION

The present invention is described in detail in the following. The crystalline polymer (A) used in the present invention is a melt-processable polymer having properties capable of forming an optically anisotropic molten phase. The properties of anisotropic molten phase can be identified by a common polarization inspection method utilizing crossed polarizer. More specifically, the identification of anisotropic molten phase can be carried out by using a Leitz polarization microscope placing the sample of molten phase on the Leitz hot stage and by observing the sample under a nitrogen atmosphere at 40-fold magnification. When the liquid crystalline polymer applicable to the present invention is inspected between the crossed polarizer and analyzer, the polarized light passes therethrough to show optical anisotropy even in a molten and resting state.

The above liquid crystalline polymer (A) is not specifically limited. However, preferred ones are aromatic polyester or aromatic polyester amide, and also included one is polyester which partly contains aromatic polyester or aromatic polyester amide within the same molecular chain. Applied above liquid crystalline polymer (A) has a logarithmic viscosity (inherent viscosity I.V.) of preferably at least about 2.0 dl/g, and more preferably 2.0 to 10.0 dl/g, when the polymer is dissolved in pentafluoro phenol at 60° C. by a content of 0.1% by weight.

Generally the structures of aromatic polyester and aromatic polyester amide are: (1) a polyester composed mainly of (a) one, two or more of aromatic hydroxy carboxylic acid and a derivative thereof, (b) one, two or more of aromatic dicarboxylic acid, alicyclic dicarboxylic acid, and a derivative thereof, and (c) one, two or more of aromatic diol, alicyclic diol, aliphatic diol, and a derivative thereof; (2) a polyester amide composed mainly of (a) one, two or more of aromatic hydroxy carboxylic acid and a derivative thereof, (b) one, two or more of aromatic hydroxy amine, aromatic diamine, and a derivative thereof, and (c) one, two or more of aromatic dicarboxylic acid, alicyclic dicarboxylic acid, and a derivative thereof; and (3) a polyester amide composed mainly of (a) one, two or more of aromatic hydroxy carboxylic acid and a derivative thereof, (b) one, two or more of aromatic hydroxy amine, aromatic diamine, and a derivative thereof, (c) one, two or more of aromatic dicarboxylic acid, alicyclic dicarboxylic acid, and a derivative thereof, and (d) one, two or more of aromatic diol, alicyclic diol, aliphatic diol, and a derivative thereof. The above structural components can further contain a molecular-weight adjuster if necessary.

Examples of preferred compounds structuring the above applicable liquid crystalline polymer (A) are: aromatic hydroxy carboxylic acids such as p-hydroxy benzoic acid or 6-hydroxy-2-naphthoic acid; aromatic diol such as 2,6-dihydroxy naphthalene, 1,4-dihydroxy naphthalene, 4,4'-dihydroxy biphenyl, hydroquinone, resorcin, or compounds represented by the following formulae (1) and (2) ; aromatic dicarboxylic acid such as terephthalic acid, isophthalic acid, 4,4'-diphenyl dicarboxylic acid, 2,6-natphhalene dicarboxylic acid, or compound represented by the following formula (3); and aromatic amine such as p-aminophenol or p-phenylene diamine.

[Chemical formula 2]

where, X is a group selected from alkylene (C1-C4), alkylidene, —O—, —SO—, —SO$_2$—, —S—, and —CO—; and Y is a group selected from —(CH$_2$)$_n$—, (n=1 to 4) and —O(CH$_2$)$_n$O—, (n=1 to 4).

Among these liquid crystalline polymers, the liquid crystalline polymer (A) used in the present invention is a liquid crystalline polymer with the content of 55% by mole or less of p-hydroxy benzoic acid residue as the terminal hydroxy carboxylic acid relative to the entire structural unit components of the liquid crystalline polymer.

If the content of p-hydroxy benzoic acid residue exceeds 55% by mole, the flowability deteriorates because of the solidification rate or the like during cooling, caused by the difference in the state of crystallization of polymer, which fails to form a planar connector having good properties. In addition, the melting point of the liquid crystalline polymer is required to be 330° C. or higher. To mount the planar connector on a circuit board and to form an electronic circuit, there is applied soldering which has functions of fixation and circuit-formation. The soldering is executed by letting the circuit board with the planar connector pass through an infrared reflow furnace. To prevent changes such as deformation on the connector in the infrared reflow furnace, the melting point of the liquid crystalline polymer is required to be 330° C. or more.

Moreover, the liquid crystalline polymer is preferably the one having 250° C. or higher deflection temperature under load, determined in accordance with ISO 75-1, 2.

Specifically preferred (A) liquid crystalline polymer is a liquid crystalline polyester resin which contains the structural units represented by the following formulae (I), (II), (III), and (IV), as the essential structural units, and the contents of the respective units to the entire structural units are: 40 to 75% by mole of the (I) structural unit; 8.5 to 30% by mole of the (II) structural unit; 8.5 to 30% by mole of the (III) structural unit; and 0.1 to 8% by mole of the (IV) structural unit.

[Chemical formula 3]

where, Ar$_1$ is 2,6-naphthalene; Ar$_2$ is one, two or more selected from 1,2-phenylene, 1,3-phenylene, and 1,4-phenylene; Ar$_3$ is at least one of 1,3-phenylene, 1,4-phenylene, and at least one of residues of compound having two or more phenylenes connected with each other at the para position; and Ar$_4$ is 1,4-phenylene.

The raw material compounds necessary to form the above liquid crystalline polyesters will be described below in detail. To obtain the above (I) to (IV) structural units, various compounds having ordinary ester-forming capability are used.

The structural unit (I) is prepared from 6-hydroxy-2-naphthoic acid.

The structural unit (II) is a dicarboxylic acid unit. As for Ar$_2$, 1,2-phenylene, 1,3-phenylene or 1,4-phenylene is selected, and preferably Ar$_2$ is derived from terephthalic acid in terms of heat resistance.

The structural unit (III) is a diol unit. As the raw material compound thereof, hydroquinone, dihydroxybiphenyl, and the like are used. Among these, dihydroxy biphenyl, specifically 4,4'-dihydroxybiphenyl is preferred in terms of heat resistance.

Furthermore, the structural unit (IV) is derived from 4-hydroxy benzoic acid.

In the present invention, the above structural units (I) to (IV) are contained, and the content range required of the respective structural components to entire structural units is: 40 to 75% by mole of the (I) structural unit, (preferably 40 to 60% by mole, and more preferably 45 to 60% by mole) ; 8.5 to 30% by mole of the (II) structural unit (preferably 17.5 to 30% by mole); 8.5 to 30% by mole of the (III) structural unit (preferably 17.5 to 30% by mole); and 0.1 to 8% by mole of the (IV) structural unit (preferably 1 to 6% by mole).

In particular, the content of structural unit of (IV) within the range of 3 to 6% by mole is preferred because a connector having a high-strength lattice area and having good flatness (low warpage deformation) can be obtained.

The all-aromatic polyester of the present invention is prepared by polymerization by direct polymerization method or ester exchange method. In conducting the polymerization, there are applied melt polymerization method, solution polymerization method, slurry polymerization method, solid-phase polymerization method, and the like.

In the present invention, an acylation agent to the polymerizing monomer, or a monomer with activated terminal as a derivative of acid chloride can be used at the time of the polymerization. Applicable acylation agent includes acid anhydride such as acetic anhydride.

In conducting the polymerization, various kinds of catalysts can be applied. Typical catalysts include dialkyltin oxide, diaryltin oxide, titanium dioxide, alkoxytitanium silicates, titanium alcoholates, alkali and alkali earth metal salts of carboxylic acid, and Lewis acid such as $BF_3$. Generally, the catalyst amount to be used is within the range of about 0.001 to 1% by weight, and preferably from about 0.003 to 0.2% by weight, to the total weight of the monomer.

When solution polymerization or slurry polymerization is carried out, liquid paraffin, highly heat-resistant synthetic oil, inert mineral oil, or the like is used as the solvent.

The reaction condition includes the reaction temperature of 200° C. to 380° C., and the ultimate pressure of 0.1 to 760 Torr (or 13 to 101,080 Pa). Specifically in the melt reaction, the reaction temperature is within the range of 260° C. to 380° C., preferably 300° C. to 360° C., and the ultimate pressure is within the range of 1 to 100 Torr (or from 133 to 13,300 Pa), preferably 1 to 50 Torr (or from 133 to 6,670 Pa).

The reaction can be initiated by supplying entire raw material monomers, acylation agent, and catalyst to the same reaction vessel, (one step method), or can be conducted by acylating the hydroxy group in the raw material monomers (I), (III), and (IV) through the use of the acylation agent, followed by causing the monomers thus acylated to react with the carboxyl group in the raw material monomer (II), (two step method).

The melt polymerization is carried out by the step of causing the reaction system to reach a specified temperature, and then of beginning decompression of the reaction system to keep a specified reduced pressure. After the torque of agitator reaches a specified value, an inert gas is introduced to the reaction system to bring into a depressurized state to a normal pressure state, and then into a specified pressurized state, in which the polymer is discharged from the reaction system.

The polymer produced by the above polymerization method can further increase the molecular weight thereof through the use of the solid-phase polymerization which heats the polymer under atmospheric pressure or reduced pressure, or in an inert gas atmosphere. A preferred condition of the solid-phase polymerization includes the reaction temperature within the range of 230° C. to 350° C., preferably 260° C. to 330° C., and the ultimate pressure within the range of 10 to 760 Torr (or 1,330 to 101,080 Pa).

The composite resin composition used in the present invention is the one made up of the above-given (A) liquid crystalline polymer, (B) plate-like inorganic filler, and (C) fibrous filler having a weight average fiber length of 250 to 600 μm.

The (B) plate-like filler used in the present invention includes talc, mica, glass flake, and various kinds of metal foils, and a preferred one is one or both of talc and mica. The mean particle size of the (B) plate-like filler is not specifically limited. Although smaller particle size thereof is preferred in view of flowability at thin part, it is necessary to maintain a specific size from the viewpoint of decreasing the warpage deformation. In concrete terms, the mean particle size thereof is preferably within the range of 1 to 100 μm, and more preferably 5 to 50 μm.

The (C) fibrous filler used in the present invention includes glass fiber, carbon fiber, whisker, inorganic fiber, mineral fiber, or the like. Among these, glass fiber is preferred.

The (C) fibrous filler is required to have a weight average fiber length within the range of 250 to 600 μm. If the weight average fiber length exceeds 600μm, the flowability deteriorates, which results in being incapable of being molded, or results in failing to attain the connector with excellent flatness even the molding can be done. If the weight average fiber length is less than 250 μm, the reinforcing effect becomes poor to thereby deteriorate the strength (mesh strength) at the lattice area for holding the terminals, which is not preferable.

Although the fiber diameter of (B) fibrous filler is not specifically limited, generally-used one has about 5 to 15 μm.

The composite resin composition used in the present invention is required to have the content of (B) component within the range of 25 to 35% by weight to the entire composition, of (C) component 10 to 25% by weight to the entire composition, and to have the sum of (B) component and (C) component within the range of 40 to 50% by weight to the entire composition.

By molding the composite resin composition according to the present invention, various kinds of planar connectors can be obtained. The process is specifically effective to obtain very thin planar connectors having a lattice area pitch interval of 1.5 mm or less, 0.5 mm or less of width of resin portion in the lattice area holding the terminals, and 5.0 mm or less of the height of entire product, which have not been provided as industrially practical products.

Figure 1:
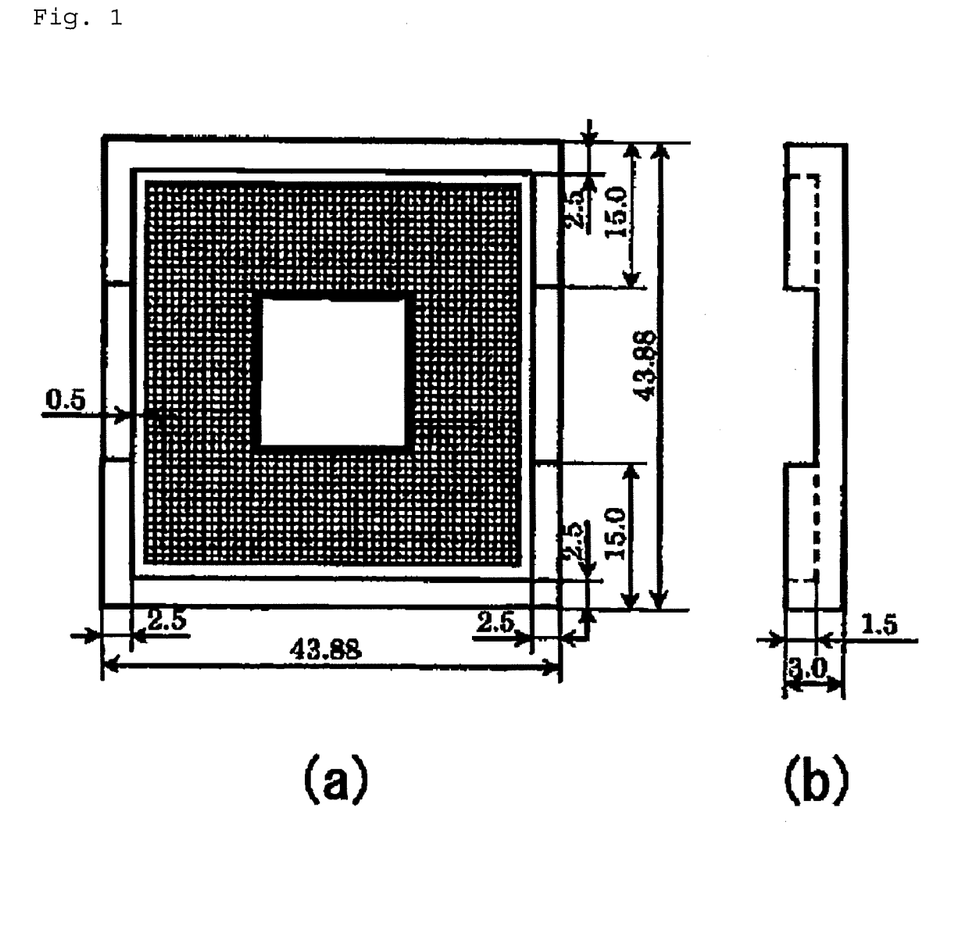
FIG. 1. A planar connector molded in the examples.

An example of the above planar connectors is the one illustrated in FIG. 1, which is molded in the examples. The connector has the outer frame area with 5.0 mm or less in thickness and the lattice area with 4.0 mm or less in thickness, and has several hundreds of pin-holes in the lattice area of the product of approximate size of 40 mm×40 mm×1 mm. As illustrated in FIG. 1, the planar connector according to the present invention has an opening of an appropriate size in the lattice part. Accordingly, the connector has a shape which makes it very difficult to perform injection molding, with the lattice area pitch interval of 1.5 mm or less, the resin portion width of 0.5 mm or less for holding the terminals, and the thickness ratio of the lattice area to the outer frame area of 0.8 or less.

As shown in FIG. 1, the use of the composite resin composition according to the present invention makes it possible to mold the very thin planar connector with good moldability, having a difference in thickness between the outer frame and the lattice area, and having very small width of the resin portion of the lattice area in that the lattice part pitch interval is 1.5 mm or less (1.2 mm), the thickness ratio of the lattice area to the outer frame area is 0.8 or less (0.5), and the width of resin portion of the lattice area for holding the terminals is 0.5 mm or less (0.18mm). The flatness of thus produced connector is also excellent.

Regarding the numerical specification of the flatness, it can be said that a practically excellent flatness is defined as 0.15 mm or less of flatness before the IR reflow step for surface mounting at the peak temperature from 230° C. to 280° C., and 0.05 mm or less of the difference in the flatness before and after the reflow.

Although the molding method to obtain the connector with such excellent flatness is not specifically limited, the economic injection molding method is preferably used. To obtain the connector having such excellent flatness by the injection molding, the use of the above liquid crystalline polymer is important, and the selection of molding condition free from residual internal stress is preferred. In order to decrease the filling pressure to decrease the residual internal stress of the obtained connector, a cylinder in the molding machine is preferably at a temperature of the melting point T° C. of the liquid crystalline polymer or higher. If the cylinder temperature is excessively high, troubles occur such as drooling from the cylinder nozzle accompanied with the decomposition of resin, and the like. Consequently, the cylinder temperature is within the range of T° C. to (T+30)° C., preferably T° C. to (T+15)° C. The mold temperature is preferably within the range of 70° C. to 100° C. If the mold temperature is low, insufficient flow of the filling resin composition occurs, which is not preferable. If the mold temperature is excessively high, there occur problems such as flash-generation, which is also not preferable. As for the injection speed, molding at 150 cm/sec or higher speed is preferred. If the injection speed is low, only non-filling molded products are produced, or even if the perfect-filling molded products are obtained, the filling pressure becomes high and the molded products has large residual internal stress, which provides only the connectors with poor flatness, in some cases.

The composite resin composition according to the present invention also includes the composition to which desired properties are imparted by the addition of additives such as nucleating agent, pigments including carbon black and inorganic calcined pigment, antioxidant, stabilizer, plasticizer, lubricator, releasing agent, fire retardant, and the like to the composite resin composition.

BRIEF DESCRIPTION OF THE DRAWINGS

FIG. 1(*a*) shows the plan view, and FIG. 1(*b*) shows the right side view. The units given in the figure are in millimeters.

FIG. 2(*a*) shows the plan view, and FIG. 2(*b*) shows the right side view. The units given in the figure are in millimeters.

EXAMPLES

The present invention will be described below referring to the examples. The present invention, however, is not limited to the examples. The measurement of physical properties and the test were given by the following-described methods.

(1) Apparent Melt Viscosity

The apparent melt viscosity was measured in accordance with ISO 11443 by using Capillary Rheometer (L=20 mm, d=1 mm, Capillograph 1B, manufactured by Toyo Seiki Seisakusho, Ltd.) at a temperature of 360° C. and at a shear rate of 1000/s. The measurement temperature was 380° C. for the liquid crystalline polymer 1 and the liquid crystalline polymer 2, 350° C. for the liquid crystalline polymer 3, and 360° C. for the liquid crystalline polymer 4.

(2) Measurement of Flatness of Connector

The planar connector (1248 pin holes) illustrated in FIG. 1 was molded by injection molding from the resin composition pellets under the condition given below. The planar connector had the entire size of 43.88 mm×43.88 mm×3 mm (t), the center opening of 13.88 mm×13.88 mm, the lattice area pitch interval of 1.0 mm, the width 0.12 mm of the resin portion of the lattice area (0.12 mm at the center, with a draft angle), the thickness 1.5 mm of the lattice area, and the width 3.0 mm of the outer frame.

Figure 2:
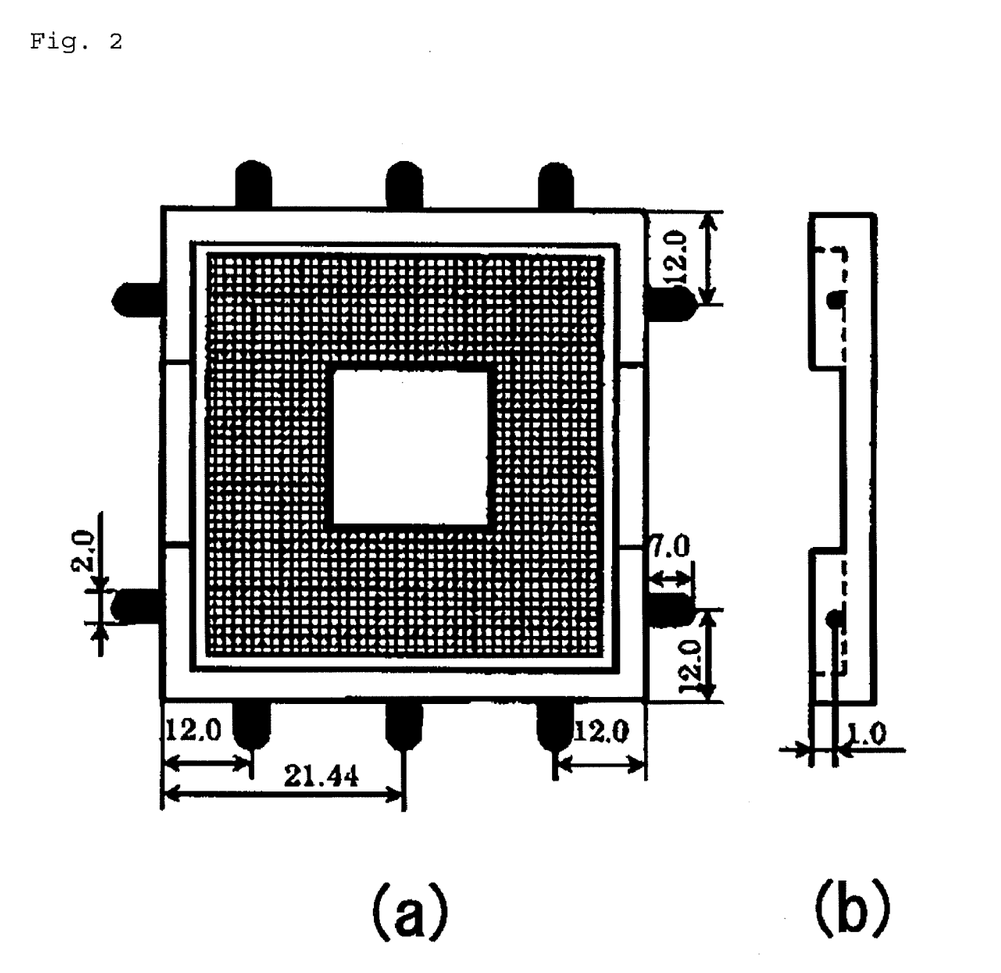
FIG. 2. The gate position on the planar connector molded in the examples.

The gate applied was a special one (overflow) illustrated in FIG. 2. The gate was the pin-side type which makes use of tab of the molded product and further uses a submarine gate to produce the molded product.

Figure 3:
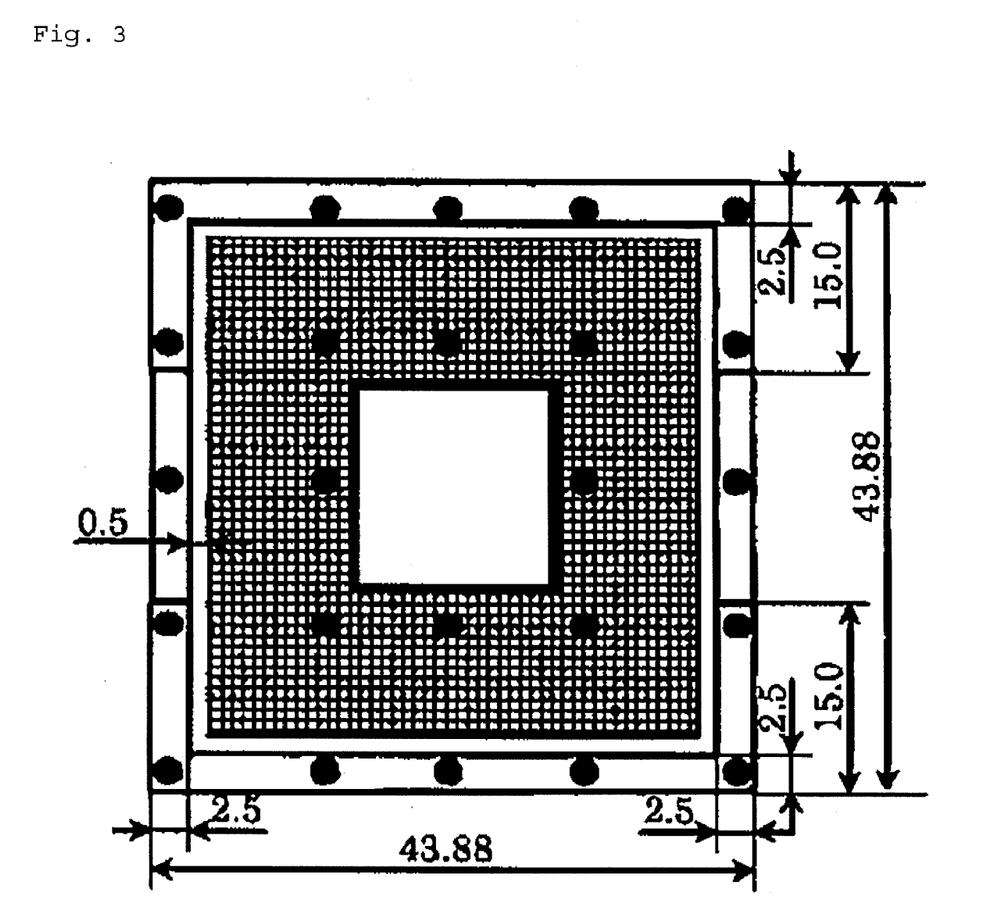
FIG. 3. The measurement points for determining the flatness of the connector of the examples. The units given in the figure are in millimeters.

Pin-gate diameter: 1.0 mm
Submarine gate diameter: 0.6 mm
The number of gates: 10
Runner size at pin-gate part: equivalent to 3.0 mm diameter
Runner size at submarine-gate part: equivalent to 2.0 mm diameter The connector obtained was placed on a horizontal table. The height of the connector was measured by CNC Vision Measuring Machine, Quick Vision 404PRO, manufactured by Mitsutoyo Corporation. The measurement was carried out at positions of 0.5 mm from the edge of the connector with an interval of 10 mm. The difference between the maximum height and the minimum height was set as the flatness (refer to FIG. 3).

The IR reflow was conducted under the condition given below, and then the flatness was measured by the above method to get the difference of flatness before and after the reflow.

[IR Reflow Condition]
Measurement machine: Large table-type reflow soldering machine FR-300 with far infrared heater (manufactured by Japan Pulse Laboratories, Inc.)
Sample feed speed: 140 mm/sec
Period of passing through the reflow furnace: 5 min
Temperature condition: 150° C. in Preheating zone, 225° C. in Reflow zone, and 287° C. of peak temperature

[Molding Condition]
Molding machine: Sodick TR100EH
Cylinder temperature:
350° C.-350° C.-350° C.-350° C.-350° C. (Comparative Examples 5 to 8)
370° C.-370° C.-370° C.-370° C.-360° C. (Examples 1 to 5, Comparative Examples 1 to 4)
380° C.-380° C.-380° C.-380° C.-370° C. (Example 6)
360° C.-360° C.-360° C.-360° C.-350° C. (Example 7)
Mold temperature: 80° C.
Injection speed: 300 mm/sec
Holding pressure: 50 MPa
Filling time: 0.09 to 0.11 sec
Holding time: 1 sec
Cooling time: 10 sec
Screw rotational speed: 120 rpm
Screw backpressure: 1 MPa (3) Melting Point of Liquid Crystalline Polymer Differential thermal analyzer (TA Instruments Q-1000) was used. The polymer having completed the polymerization was heated from room temperature to 400° C. at an increasing rate of 20° C./min, and was held to 400° C. for 3 min. Then, the polymer was cooled to room temperature at a decreasing rate of 20 ° C./min After that, the measurement was carried out under the condition of heating at an increasing rate of 20° C./min, again.

(4) Minimum Filling Pressure

When the planar connector of FIG. 1 was prepared by injection molding, the minimum injection filling pressure for obtaining good molded product was set as the minimum filling pressure.

(5) Mesh Strength

Figure 4:
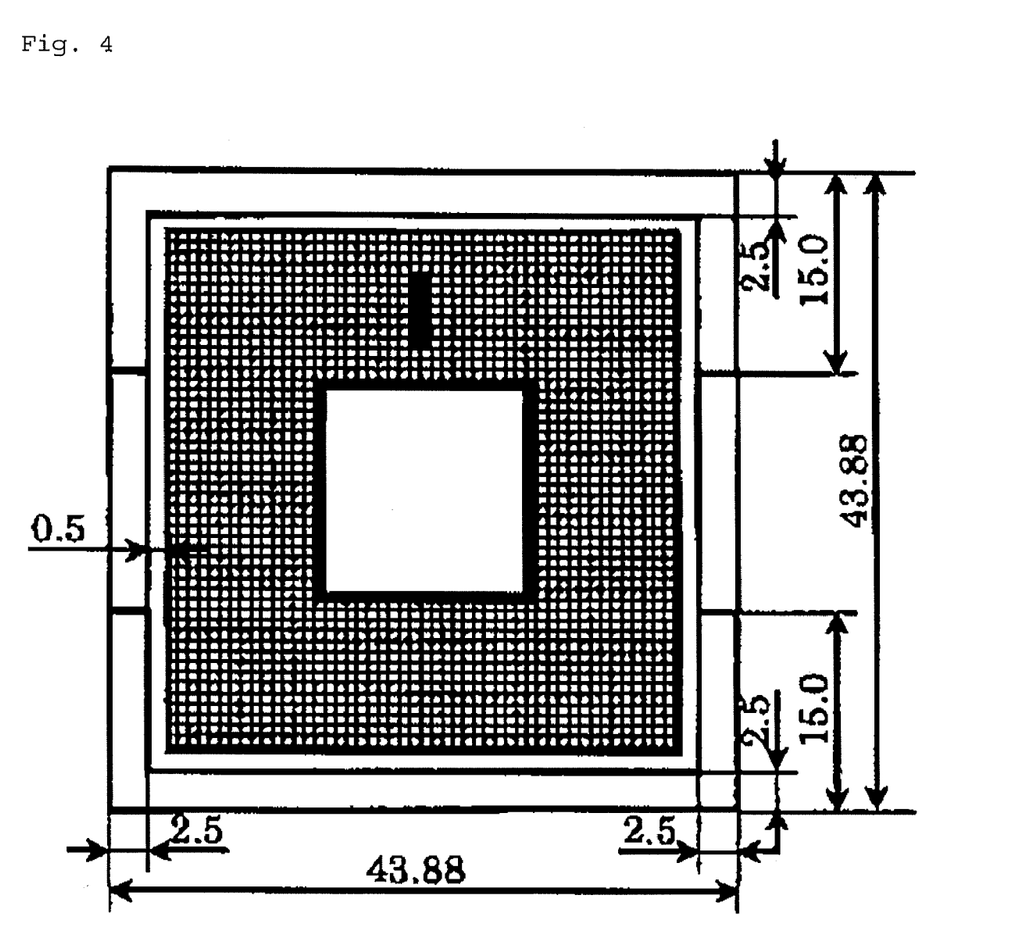
FIG. 4. The measurement points for determining the mesh strength in the examples. The units given in the figure are in millimeters.

By using the planar connector of FIG. 1, the strength was measured at the positions (black) shown in FIG. 4 as the mesh strength.

Testing machine: Tensilon RTA-250 manufactured by Orientec Co., Ltd.

Span: 6 mm

Testing speed: 1 ram/min (6) Deflection Temperature Under Load

The deflection temperature under load was measured under the condition given below for the injection-molded sole liquid crystalline polymer and for the injection-molded liquid crystalline polymer composition containing plate-like filler and fibrous filler, in accordance with ISO 75-1, 2.

[Molding Condition]

Molding machine: Sumitomo SE100DU

Cylinder temperature:

350° C.-350° C.-350° C.-350° C.-350° C. (Comparative Examples 5 to 8)

370° C.-370° C.-370° C.-370° C.-360° C. (Examples 1 to 5, Comparative Examples 1 to 4)

380° C.-380° C.-380° C.-380° C.-370° C. (Example 6)

360° C.-360° C.-360° C.-360° C.-350° C. (Example 7)

Die temperature: 90° C.

Injection speed: 2 m/min

Holding pressure: 50 MPa

Filling time: 7 sec

Cooling time: 10 sec

Screw rotational speed: 120 rpm

Screw backpressure: 1 MPa (7) Weight Average Fiber Length

A 5 g of resin composition pellets was heated to carry out ashing for 2 hours at 600° C. The ashing residue was fully dispersed in an aqueous solution of 5% polyethylene glycol, which was then transferred on a Petri dish by using a dropper. The glass fibers were observed by microscope. At the same time, the weight average fiber length of the glass fibers was measured by using an image analyzer (LUZEXFS, manufactured by Nireco Co., Ltd.) The measurement was given excluding the glass fibers having a length of 50 μm or less.

Examples 1 to 7, Comparative Examples 1 to 8

Evaluation was carried out on specimens of liquid crystalline polymer compositions containing a plate-like filler and a fibrous filler, under the condition given below. The results are shown in Table 1. In Comparative Example 8, no good specimen was obtained by injection molding.

[Manufacturing Condition]

(Applied Components)

(A) Liquid Crystalline Polymer

Liquid crystalline polymer 1

The following raw material monomers, metal catalyst, and acylation agent were supplied to a polymerization vessel equipped with an agitator, a reflux column, a monomer-supply opening, a nitrogen inlet, and an evacuation/discharge line.

(I) 6-Hydroxy-2-naphthoic acid 1218 g (48% by mole) (HNA)

(II) Terephthalic acid 560 g (25% by mole) (TA)

(III) 4,4'-Dihydroxy biphenyl 628 g (25% bymole) (BP)

(IV) 4-Hydroxy benzoic acid 37 g (2% by mole) (HBA)

Potassium acetate catalyst (catalyst amount)

Acetic anhydride (1.04 times mole to the total moles of HNA, BP, and HBA)

The supplied components were agitated at 140° C. for 1 hour in nitrogen gas-streaming atmosphere, and were heated to 360° C. for 5.5 hours under the agitation. Then, the polymerization vessel was evacuated to 5 Torr (or 667 Pa) for 30 minutes to conduct the melt polymerization while distilling low-boiling components such as acetic acid. After the agitator torque reached a specified level, nitrogen gas was supplied to the polymerization vessel to be brought into a pressurized state, and the polymer was discharged from the bottom of the polymerization vessel. The discharged strand of polymer was pelletized to obtain the pellets. Thus prepared pellets were heat-treated at 300° C. for 8 hours in a nitrogen-streaming atmosphere, which was defined as the liquid crystalline polymer 1. The melting point of the liquid crystalline polymer 1 was 352° C., and the deflection temperature under load of the polymer was 300° C.

Liquid crystalline polymer 2

The following raw material monomers, metal catalyst, and acylation agent were supplied to a polymerization vessel equipped with an agitator, a reflux column, a monomer-supply opening, a nitrogen inlet, and an evacuation/discharge line.

(I) 6-Hydroxy-2-naphthoic acid 76 g (2.5% by mole) (HNA)

(II) Terephthalic acid 645 g (23.9% by mole) (TA)

(III) 4,4'-Dihydroxy biphenyl 562 g (18.6% by mole) (BP)

(IV) 4-Hydroxy benzoic acid 1121 g (50% by mole) (HBA)

(V) 4 Acetoamidophenol 123 g (5% by mole) (APAP)

Potassium acetate catalyst (catalyst amount)

Acetic anhydride (1.03 times mole to the total moles of HNA, BP, and HBA)

The supplied components were agitated at 140° C. for 1 hour in nitrogen gas-streaming atmosphere, and were heated to 350° C. for 5.5 hours under the agitation. Then, the polymerization vessel was evacuated to 5 Torr (or 667 Pa) for 30 minutes to conduct the melt polymerization while distilling low-boiling components such as acetic acid. After the agitator torque reached a specified level, nitrogen gas was supplied to the polymerization vessel to be brought into a pressurized state, and the polymer was discharged from the bottom of the polymerization vessel. The discharged strand of polymer was pelletized to obtain the pellets. Thus prepared pellets were heat-treated at 280° C. for 8 hours in a nitrogen-streaming atmosphere, which was defined as the liquid crystalline polymer 2. The melting point of the liquid crystalline polymer 2 was 367° C., and the deflection temperature under load of the polymer was 260° C.

Liquid crystalline polymer 3

The following raw material monomers, metal catalyst, and acylation agent were supplied to a polymerization vessel equipped with an agitator, a reflux column, a monomer-supply opening, a nitrogen inlet, and an evacuation/discharge line.

(I) 6-Hydroxy-2-naphthoic acid 157 g (5% by mole) (HNA)

(II) Terephthalic acid 490 g (17.7% by mole) (TA)

(III) 4,4'-Dihydroxy biphenyl 382 g (12.3% by mole) (BP)

(IV) 4-Hydroxy benzoic acid 1381 g (60% by mole) (HBA)

(V) 4 Acetoamidophenol 126 g (5% by mole) (APAP)

Potassium acetate catalyst (catalyst amount)

Acetic anhydride (1.03 times mole to the total moles of HNA, BP, and HBA)

The supplied components were agitated at 140° C. for 1 hour in nitrogen gas-streaming atmosphere, and were heated to 340° C. for 5.5 hours under the agitation. Then, the polymerization vessel was evacuated to 5 Torr (or 667 Pa) for 30 minutes to conduct the melt polymerization while distilling low-boiling components such as acetic acid. After the agitator torque reached a specified level, nitrogen gas was supplied to the polymerization vessel to be brought into a pressurized state, and the polymer was discharged from the bottom of the polymerization vessel. The discharged strand of polymer was pelletized to obtain the pellets. Thus prepared pellets were heat-treated at 280° C. for 8 hours in a nitrogen-streaming atmosphere, which was defined as the liquid crystalline polymer 3. The melting point of the liquid crystalline polymer 3 was 335° C., and the deflection temperature under load of the polymer was 235° C.

Liquid crystalline polymer 4

The following raw material monomers, metal catalyst, and acylation agent were supplied to a polymerization vessel equipped with an agitator, a reflux column, a monomer-supply opening, a nitrogen inlet, and an evacuation/discharge line.

(I) 6-Hydroxy-2-naphthoic acid 157 g (45% by mole) (HNA)
(II) Terephthalic acid 77 g (25% by mole) (TA)
(III) 4,4'-Dihydroxy biphenyl 86 g (25% by mole) (BP)
(IV) 4-Hydroxy benzoic acid 13 g (5% by mole) (HBA)
Potassium acetate catalyst (catalyst amount)
Acetic anhydride (1.1 times mole to the total moles of HNA, BP, and HBA)

The supplied components were agitated at 140° C. for 1 hour in nitrogen gas-streaming atmosphere, and were heated to 360° C. for 5.5 hours under the agitation. Then, the polymerization vessel was evacuated to 5 Torr (or 667 Pa) for 30 minutes to conduct the melt polymerization while distilling low-boiling components such as acetic acid. After the agitator torque reached a specified level, nitrogen gas was supplied to the polymerization vessel to be brought into a pressurized state, and the polymer was discharged from the bottom of the polymerization vessel. The discharged strand of polymer was pelletized to obtain the pellets. Thus prepared pellets were heat-treated at 300° C. for 8 hours in a nitrogen-streaming atmosphere, which was defined as the liquid crystalline polymer 4. The melting point of the liquid crystalline polymer 4 was 335° C., and the deflection temperature under load of the polymer was 257° C.

(B) Plate-like Filler

Mica: average particle size 25 μm, AB-25S manufactured by Yamaguchi Mica Co., Ltd.

Talc: average particle size 10 μm, Crown Talc PP, manufactured by Matsumura Sangyo Co., Ltd.

(C) Fibrous filler

Longer glass fiber: ECS03T-786H, chopped strand of fiber diameter 10 μm and length 3 mm, manufactured by Nippon Electric Glass Co., Ltd.

Milled glass fiber: PF70E001, fiber diameter 10 μm and length 70 μm, manufactured by Nitto Boseki Co., Ltd.

TABLE 1

|  |  | Example |  |  |  |  |  |  | Comparative Example |  |
|---|---|---|---|---|---|---|---|---|---|---|
|  |  | 1 | 2 | 3 | 4 | 5 | 6 | 7 | 1 | 2 |
| Liquid crystalline polyester 1 | wt % | 55 | 55 | 60 | 55 | 55 |  |  | 65 | 55 |
| Liquid crystalline polyester 2 | wt % |  |  |  |  |  | 55 |  |  |  |
| Liquid crystalline polyester 3 | wt % |  |  |  |  |  |  |  |  |  |
| Liquid crystalline polyester 4 | wt % |  |  |  |  |  |  | 55 |  |  |
| Mica | wt % |  |  |  |  |  | 30 |  |  |  |
| Talc | wt % | 30 | 30 | 30 | 25 | 35 |  | 30 | 20 | 30 |
| Longer glass fiber | wt % | 15 | 15 | 10 | 20 | 10 | 15 | 15 | 15 | 5 |
| Milled glass fiber | wt % |  |  |  |  |  |  |  |  |  |
| Length of glass fiber | μm | 400 | 480 | 400 | 400 | 400 | 400 | 470 | 400 | 400 |
| Melt viscosity | Pa · s | 37 | 40 | 35 | 40 | 40 | 36 | 31 | 33 | 32 |
| Deflection temperature under load | ° C. | 315 | 316 | 308 | 317 | 308 | 305 | 306 | 315 | 305 |
| Mesh strength | N | 15.5 | 15.8 | 13.9 | 14.1 | 13.2 | 15.4 | 16.6 | 15.5 | 10.9 |
| Minimum filling pressure | MPa | 187 | 195 | 144 | 173 | 162 | 181 | 198 | 175 | 122 |
| Flatness before reflow | mm | 0.11 | 0.11 | 0.13 | 0.12 | 0.14 | 0.09 | 0.10 | 0.15 | 0.14 |
| Difference in flatness before and after reflow | mm | 0.04 | 0.05 | 0.05 | 0.05 | 0.05 | 0.04 | 0.04 | 0.10 | 0.06 |

|  |  | Comparative Example |  |  |  |  |  |
|---|---|---|---|---|---|---|---|
|  |  | 3 | 4 | 5 | 6 | 7 | 8 |
| Liquid crystalline polyester 1 | wt % | 60 | 68 |  |  |  |  |
| Liquid crystalline polyester 2 | wt % |  |  |  |  |  |  |
| Liquid crystalline polyester 3 | wt % |  |  | 70 | 60 | 68 | 65 |
| Liquid crystalline polyester 4 | wt % |  |  |  |  |  |  |
| Mica | wt % |  | 22 |  |  |  |  |
| Talc | wt % | 30 |  |  | 30 | 22 | 20 |
| Glass fiber | wt % |  |  |  |  | 10 | 15 |
| Milled fiber | wt % | 10 | 10 | 30 | 10 |  |  |
| Length of glass fiber | μm | 70 | 70 | 70 | 70 | 310 | 550 |
| Melt viscosity | Pa · s | 35 | 33 | 38 | 35 | 25 | 43 |
| Deflection temperature under load | ° C. | 300 | 310 | 250 | 240 | 250 | 272 |
| Mesh strength | N | 10.6 | 11.0 | 12.7 | 10.9 | 14.6 | 15.1 |
| Minimum filling pressure | MPa | 123 | 125 | 184 | 182 | 182 | — |
| Flatness before reflow | mm | 0.12 | 0.18 | 0.19 | 0.14 | 0.16 | — |
| Difference in flatness before and after reflow | mm | 0.05 | 0.08 | 0.09 | 0.08 | 0.08 | — |

The invention claimed is:

1. A planar connector, composed of a composite resin composition comprising (A) a liquid crystalline polymer comprising 55% by mole or less of p-hydroxy benzoic acid residue and having a melting point of 330° C. or higher, (B) a plate-like inorganic filler, and (C) a fibrous filler having a weight average fiber length within a range of 250 to 600 µm, the amount of (B) component being 25 to 35% by weight to the total composition, the amount of (C) component being 10 to 25% by weight to the total composition, the sum in total of (B) component and (C) component being 40 to 50% by weight to the total composition, wherein the connector has a lattice structure inside an outer frame, and has an opening inside the lattice area, and wherein the pitch interval of the lattice area is 1.5 mm or less, and the ratio of the thickness of the thickness of the lattice area to the outer frame area is 0.8 or less.

2. The planar connector according to claim 1, wherein the (A) liquid crystalline polymer has a deflection temperature under load of 250° C. or higher, measured in accordance with ISO 75-1, 2.

3. The planar connector according to claim 1, wherein the (A) liquid crystalline polymer is a liquid crystalline polyester resin which comprises structural units, as essential components, represented by the general formulae (I), (II), (Ill) and (IV), the amount of the (I) structural unit is 40 to 75% by mole, the amount of the (II) structural unit is 8.5 to 30% by mole, the amount of the (III) structural unit is 8.5 to 30% by mole, and the amount of the (IV) structural unit is 0.1 to 8% by mole, relative to the total structural units:

where, $Ar_1$ is 2,6-naphthalene, $Ar_2$ is one, two or more selected from 1,2-phenylene, 1,3-phenylene, and 1,4-phenylene, $Ar_3$ is at least one selected from the group consisting of 1,3-phenylene, 1,4-phenylene, and a residue of a compound having two or more of phenylenes connected with each other at the para position, and $Ar_4$ is 1,4-phenylene.

4. The planar connector according to claim 1, wherein the (B) plate-like inorganic filler is one or more selected from the group consisting of talc and mica.

5. The planar connector according to claim 2, wherein the (A) liquid crystalline polymer is a liquid crystalline polyester resin which comprises structural units, as essential components, represented by the general formulae (I), (II), (Ill) and (IV), the amount of the (I) structural unit is 40 to 75% by mole, the amount of the (II) structural unit is 8.5 to 30% by mole, the amount of the (III) structural unit is 8.5 to 30% by mole, and the amount of the (IV) structural unit is 0.1 to 8% by mole, relative to the total structural units:

where, $Ar_1$ is 2,6-naphthalene, $Ar_2$ is one, two or more selected from 1,2-phenylene, 1,3-phenylene, and 1,4-phenylene, $Ar_3$ is at least one selected from the group consisting of 1,3-phenylene, 1,4-phenylene, and a residue of a compound having two or more of phenylenes connected with each other at the para position, and $Ar_4$ is 1,4-phenylene.

6. The planar connector according to claim 2, wherein the (B) plate-like inorganic filler is one or more selected from the group consisting of talc and mica.

7. The planar connector according to claim 3, wherein the (B) plate-like inorganic filler is one or more selected from the group consisting of talc and mica.

8. The planar connector according to claim 5, wherein the (B) plate-like inorganic filler is one or more selected from the group consisting of talc and mica.

* * * * *